US012749828B2

(12) United States Patent
Wen et al.

(10) Patent No.: US 12,749,828 B2
(45) Date of Patent: Sep. 29, 2026

(54) ANTENNA SUBARRAY, ANTENNA ARRAY, AND POLARIZATION RECONFIGURATION METHOD AND APPARATUS

(71) Applicant: Huawei Technologies Co., Ltd., Shenzhen (CN)

(72) Inventors: Geyi Wen, Nanjing (CN); Ming Zhang, Hangzhou (CN); Bin Wang, Hangzhou (CN)

(73) Assignee: Huawei Technologies Co., Ltd., Shenzhen (CN)

(*) Notice: Subject to any disclaimer, the term of this patent is extended or adjusted under 35 U.S.C. 154(b) by 222 days.

(21) Appl. No.: 18/343,889

(22) Filed: Jun. 29, 2023

(65) Prior Publication Data

US 2023/0344149 A1 Oct. 26, 2023

Related U.S. Application Data

(63) Continuation of application No. PCT/CN2021/139983, filed on Dec. 21, 2021.

(30) Foreign Application Priority Data

Dec. 31, 2020 (CN) ........................ 202011632003.9

(51) Int. Cl.
*H01Q 21/24* (2006.01)

(52) U.S. Cl.
CPC .................................. *H01Q 21/24* (2013.01)

(58) Field of Classification Search
CPC .. H01Q 21/24; H01Q 21/0006; H01Q 9/0428; H01Q 21/065; H01Q 21/245; H01Q 21/20; H01Q 15/24; H01Q 3/40; H04L 25/0248
See application file for complete search history.

(56) References Cited

U.S. PATENT DOCUMENTS

| | | | | |
|---|---|---|---|---|
| 2005/0020310 A1* | 1/2005 | Nakaya | ................ | H04B 7/0617 455/562.1 |
| 2016/0352012 A1* | 12/2016 | Foo | ........................ | H04B 7/043 |

FOREIGN PATENT DOCUMENTS

CN 110911814 A 3/2020

OTHER PUBLICATIONS

Wen, "Optimal Design of Antenna Arrays" (Year: 2014).*
Debogovic, Tomislav et al., "Low-profile Multi-Function Antenna System for Small Satellites", Apr. 10, 2016, pp. 1-5, 032906861, DOI: 10.1109/EUCAP.2016.7481858.
Kraft U. R., "An Experimental Study on 2 2 Sequential-Rotation Arrays with Circularly Polarized Microstrip Radiators", IEEE Transactions on Antennas and Propagation, vol. 45, No. 10, Oct. 1997, pp. 1459-1466, XP000702476, ISSN: 0018-926X, DOI: 10.1109/8.633850.

* cited by examiner

*Primary Examiner* — Dimary S Lopez Cruz
*Assistant Examiner* — Anna N Hamadyk
(74) *Attorney, Agent, or Firm* — Slater Matsil, LLP

(57) ABSTRACT

An antenna subarray, an antenna array, and a polarization reconfiguration method and apparatus are provided. The antenna subarray includes m antenna elements. m is an integer greater than or equal to 2. The m antenna elements are placed at an interval of 360/m degrees in sequence. A distance between any two adjacent antenna elements is less than 0.5 times an operating wavelength. The distance between any two antenna elements is controlled within 0.5λ, so that polarization reconfiguration may be implemented.

20 Claims, 11 Drawing Sheets

ANTENNA SUBARRAY, ANTENNA ARRAY, AND POLARIZATION RECONFIGURATION METHOD AND APPARATUS

CROSS-REFERENCE TO RELATED APPLICATIONS

This application is a continuation of International Application No. PCT/CN2021/139983, filed on Dec. 21, 2021, which claims priority to Chinese Patent Application No. 202011632003.9, filed on Dec. 31, 2020. The disclosures of the aforementioned applications are hereby incorporated by reference in their entireties.

TECHNICAL FIELD

This application relates to the field of wireless communication technologies, and in particular, to an antenna subarray, an antenna array, and a polarization reconfiguration method and apparatus.

BACKGROUND

In a complex climate and electromagnetic environment, a linearly polarized antenna cannot meet requirements of satellite communication, space detection, radar target tracking and positioning, and the like. Compared with the linearly polarized antenna, a circularly polarized antenna can reduce signal leakage and attenuation, and eliminate a polarization distortion caused by ionospheric Faraday rotation. Therefore, the circularly polarized antenna is used more widely.

Circular polarization is classified into left-handed circular polarization and right-handed circular polarization. When a signal transmit end transmits a signal through a left-handed circularly polarized antenna, a signal receive end also needs to receive the signal through the left-handed circularly polarized antenna. When the signal transmit end transmits a signal through a right-handed circularly polarized antenna, the signal receive end also needs to receive the signal through the right-handed circularly polarized antenna.

To match polarization manners of a transmit antenna and a receive antenna and avoid polarization isolation, how to design an antenna with a polarization reconfiguration function and how to implement polarization reconfiguration of the antenna are technical problems that need to be resolved.

SUMMARY

Embodiments of this application provide an antenna subarray, an antenna array, and a polarization reconfiguration method and apparatus, so as to provide a polarization reconfigurable antenna and a manner for performing polarization reconfiguration on an antenna.

A first aspect provides an antenna subarray, including m antenna elements. m is an integer greater than or equal to 2. The m antenna elements are placed at an interval of 360/m degrees in sequence. A distance between any two adjacent antenna elements is less than 0.5 times an operating wavelength (λ).

In the first aspect, the distance between any two antenna elements is controlled within 0.5λ, so that polarization reconfiguration may be implemented. In addition, compared with a conventional array antenna, a polarization reconfigurable antenna including such an antenna subarray has a small antenna diameter and a small spacing, and may avoid generation of a grating lobe during large-angle scanning.

Further, the distance between any two adjacent antenna elements may be less than or equal to 0.3 times the operating wavelength.

In a possible implementation, the antenna element may be a left-handed circularly polarized antenna element, or may be a right-handed circularly polarized antenna element. This is not limited in this application.

A second aspect provides an antenna array, including one or more antenna subarrays described in the first aspect and any possible implementation of the first aspect. Compared with a conventional array antenna, a polarization reconfigurable antenna including such an antenna array has a small antenna diameter and a small spacing, and may avoid generation of a grating lobe during large-angle scanning.

In a possible implementation, a difference of distances between any two of a plurality of antenna subarrays may be less than or equal to a first preset value. A plurality of antenna arrays are arranged at an equal spacing, so that a size of the antenna array may be reduced, and technical effects of a small antenna diameter, a small spacing, and no grating lobe generated during large-angle scanning may be further achieved.

A third aspect provides a communication device, including one or more antenna arrays in the second aspect and any possible implementation of the second aspect. For technical effects of the third aspect, refer to those of the second aspect and the possible implementation of the second aspect. Details are not described herein again.

A fourth aspect provides a polarization reconfiguration method. First, a communication device may determine a transmission matrix between the communication device and another device based on transmit power of the communication device and transmit power of the another device. The transmission matrix includes a plurality of transmission coefficients. Each transmission coefficient is associated with a port corresponding to each antenna element in the communication device. Then, the communication device may determine a plurality of non-zero eigenvalues of the transmission matrix, further determine a maximum value in the plurality of non-zero eigenvalues, and further determine an eigenvector corresponding to the maximum value. The eigenvector includes a phase value of the port corresponding to each antenna element in the communication device. Next, the communication device configures a phase for the antenna element in an antenna array based on the eigenvector.

In a possible implementation, the communication device may transmit a signal to the another device by using a phased antenna array.

In the fourth aspect, the eigenvector corresponding to the maximum eigenvalue is calculated for the transmission matrix between the communication device and the another device, and the phase is configured for the antenna array based on the eigenvector. In this way, a most appropriate polarization manner for communication between the communication device and the another device may be reconfigured, and communication may be performed in the most appropriate polarization manner, thereby improving transmission efficiency.

A fifth aspect provides a communication apparatus. The apparatus has functions of implementing the fourth aspect and any possible implementation of the fourth aspect. These functions may be implemented by hardware, or may be implemented by hardware executing corresponding software. The hardware or the software includes one or more functional modules corresponding to the foregoing functions.

A sixth aspect provides a communication apparatus, including a processor, configured to execute a computer program or instructions. When the computer program or the instructions are executed, a function of the communication device in the method according to the fourth aspect and any possible implementation of the fourth aspect is implemented. The computer program or the instructions may be stored in the processor, or may be stored in a memory. The memory is coupled to the processor. The memory may be located in the communication apparatus, or may not be located in the communication apparatus.

In a possible implementation, the apparatus further includes a transceiver, configured to send a signal processed by the processor, or receive a signal input to the processor. The transceiver may perform a signal sending action or a signal receiving action performed by the communication device in the fourth aspect or any possible implementation of the fourth aspect.

According to a seventh aspect, this application provides a communication apparatus, including a processor and an interface circuit. The interface circuit is configured to receive a signal from a communication apparatus other than the communication apparatus and transmit the signal to the processor, or send a signal from the processor to a communication apparatus other than the communication apparatus. The processor implements a function of the communication device in the method according to the fourth aspect and any possible implementation of the fourth aspect by using a logic circuit or executing code instructions.

In a possible implementation, the communication apparatus may be a chip system, and may include a chip, or may include a chip and another discrete device.

An eighth aspect provides a computer-readable storage medium, configured to store a computer program. The computer program includes instructions for implementing a function in the fourth aspect and any possible implementation of the fourth aspect.

A ninth aspect provides a computer program product. The computer program product includes computer program code. When the computer program code is run on a computer, the computer is enabled to perform the method performed by the communication device in the fourth aspect and any possible implementation of the fourth aspect.

For technical effects of the fifth aspect to the ninth aspect, refer to the descriptions in the fourth aspect. Repeated parts are not described again.

DETAILED DESCRIPTION OF ILLUSTRATIVE EMBODIMENTS

The following describes in detail embodiments of this application with reference to accompanying drawings.

For ease of understanding the technical solutions in embodiments of this application, the following briefly describes a system architecture for a method provided in embodiments of this application. It may be understood that the system architecture described in embodiments of this application is intended to describe the technical solutions in embodiments of this application more clearly, and do not constitute any limitation on the technical solutions provided in embodiments of this application.

The technical solutions in embodiments of this application may be applied to various communication systems, for example, a satellite communication system, a conventional mobile communication system, and a non-terrestrial network (NTN) communication system. The communication system is, for example, a wireless local area network (WLAN) communication system, a long term evolution (LTE) system, an LTE frequency division duplex (FDD) system, LTE time division duplex (TDD), a universal mobile telecommunication system (UMTS), a worldwide interoperability for microwave access (WiMAX) communication system, a 5th generation (5G) system or a new radio (NR) system, a 6th generation (6G) system, or a future communication system.

For ease of understanding embodiments of this application, the following describes an application scenario of this application. A network architecture and a service scenario described in embodiments of this application are intended to describe the technical solutions in embodiments of this application more clearly, and do not constitute a limitation on the technical solutions provided in embodiments of this application. A person of ordinary skill in the art may know that, as a new service scenario emerges, the technical solutions provided in embodiments of this application are also applicable to a similar technical problem.

Figure 1:
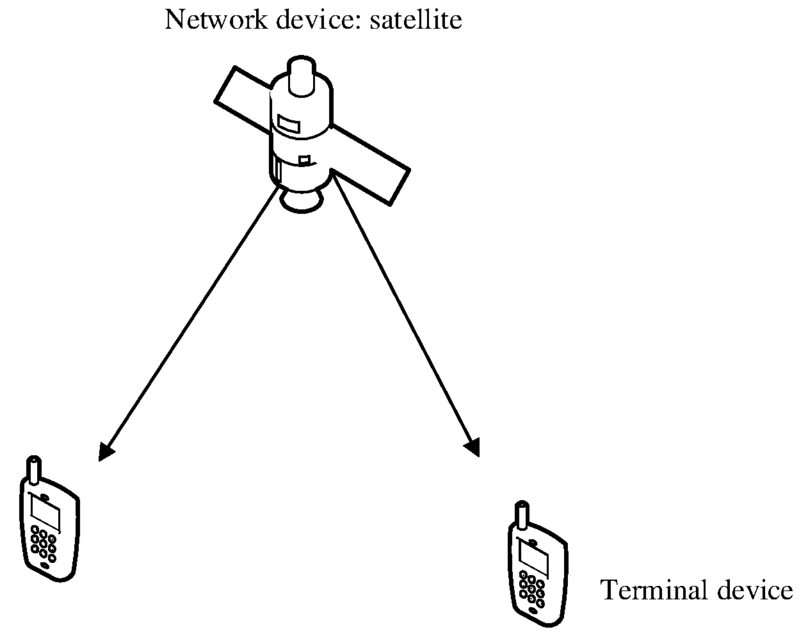
FIG. 1 is a schematic diagram of an architecture of a communication system according to an embodiment of this application.

As shown in FIG. 1, a communication system is provided, including a network device and a terminal. The network device may be a terrestrial network device (for example, a base station), or may be a network device of a non-terrestrial network (NTN) (for example, a satellite or a satellite base station). A circularly polarized antenna is disposed in the network device. For example, a polarization reconfigurable circularly polarized antenna may be disposed. A circularly polarized antenna may also be disposed on the terminal device. For example, a polarization reconfigurable circularly polarized antenna may be disposed. A signal may be transmitted between the network device and the terminal device by using the circularly polarized antennas, to implement communication. Circular polarization includes left-handed circular polarization and right-handed circular polarization. Generally, when a signal transmit end (for example, a satellite) transmits a signal by using a left-handed circularly polarized antenna, a signal receive end (for example, a terminal) should also receive the signal by using a left-handed circularly polarized antenna. When a signal transmit end (for example, a satellite) transmits a signal by using a right-handed circularly polarized antenna, a signal receive end (for example, a satellite) should also receive the signal by using a right-handed circularly polarized antenna. For the signal transmit end, a polarization manner of an antenna that transmits the signal may be adjusted. For the signal receive end, an antenna for which any polarization manner is used (for example, left-handed circular polarization) may be first used to receive the signal. If the signal cannot be received or quality of the received signal is poor, an antenna for which another polarization manner is used (for example, right-handed circular polarization) may be used to receive the signal.

To match polarization manners of the signal transmit end and the signal receive end, this application provides a polarization reconfigurable antenna and a manner for performing polarization reconfiguration on an antenna.

For ease of understanding embodiments of this application, the following explains and describes some terms in embodiments of this application to facilitate understanding by a person skilled in the art.

The network device includes a device capable of providing a random access function for the terminal device or a chip that may be disposed in the device. The device includes but is not limited to an evolved NodeB (eNB), a radio network controller (RNC), a NodeB (NB), a base station controller (BSC), a base transceiver station (BTS), a home base station (for example, a home evolved NodeB or home NodeB, HNB), a baseband unit (BBU), an access point (AP) in a Wi-Fi system, a wireless relay node, a wireless backhaul node, a transmission point (transmission and reception point, TRP, or transmission point, TP), and the like, may be a gNB or a transmission point (TRP or TP) in a 5G system, for example, an NR system, or one or one group of antenna panels (including a plurality of antenna panels) of a base station in a 5G system, or may be a network node forming a gNB or a transmission point, for example, a baseband unit (BBU) or a distributed unit (DU).

The terminal device, also referred to as user equipment (UE), a mobile station (MS), a mobile terminal (MT), a terminal, or the like, is a device that provides voice and/or data connectivity for a user. For example, the terminal device includes a handheld device, a vehicle-mounted device, or the like that has a wireless connection function. Currently, the terminal device may be a mobile phone, a tablet computer, a laptop computer, a palmtop computer, a mobile internet device (MID), a wearable device, a virtual reality (VR) device, an augmented reality (AR) device, a wireless terminal in industrial control, a wireless terminal in self-driving, a wireless terminal in remote surgery, a wireless terminal in a smart grid, a wireless terminal in transportation safety, a wireless terminal in a smart city, a wireless terminal in a smart home, a wireless terminal in vehicle-to-vehicle (V2V) communication, or the like.

The antenna transmits an electromagnetic wave to surrounding space. The electromagnetic wave includes an electric field and a magnetic field. A direction of electric field strength is a polarization direction of the antenna. When the direction of the electric field strength is perpendicular to the ground, the electromagnetic wave is referred to as a vertically polarized electromagnetic wave. When the direction of the electric field strength is parallel to the ground, the electromagnetic wave is referred to as a horizontally polarized electromagnetic wave. A plane formed by a polarization direction of the polarized electromagnetic wave and a propagation direction of the electromagnetic wave is referred to as a polarization plane.

If the electric field strength of the polarized electromagnetic wave is always in a (horizontal) plane perpendicular to the propagation direction, and an endpoint of an electric field vector of the polarized electromagnetic wave moves along a closed trajectory, the polarized electromagnetic wave is referred to as a plane polarized wave. A vector-end trajectory of the electric field is referred to as a polarization curve, and the polarized wave is named according to a shape of the polarization curve. If the trajectory (polarization curve) is a straight line, it is referred to as linear polarization. If the trajectory (polarization curve) is a circle, it is referred to as circular polarization. If the trajectory (polarization curve) is an ellipse, it is referred to as elliptical polarization.

It may also be understood that, when an included angle between the polarization plane of the electromagnetic wave and a geodetic normal plane changes from 0 to 360 degrees periodically, that is, the electric field strength remains unchanged, the direction of the electric field strength changes with time, and the vector-end trajectory of the electric field is projected as a circle on the plane perpendicular to the propagation direction, it is referred to as circular polarization.

If the polarization plane rotates with time, and has a left-hand screw relationship with the propagation direction of the electromagnetic wave, it is referred to as left-handed circular polarization. If the polarization plane rotates with time, and has a right-hand screw relationship with the propagation direction of the electromagnetic wave, it is referred to as right-handed circular polarization.

The following describes the solutions in detail with reference to the accompanying drawings. Features or content denoted by dashed lines in the accompanying drawings may be understood as optional operations or optional structures in embodiments of this application. It may be understood that locations of feed points in a linearly polarized antenna element and a circularly polarized antenna element in FIG. 2, FIG. 3*a*, FIG. 3*b*, FIG. 3*c*, and FIG. 4 in this application are merely examples, and should not be construed as a limitation.

Figure 2:
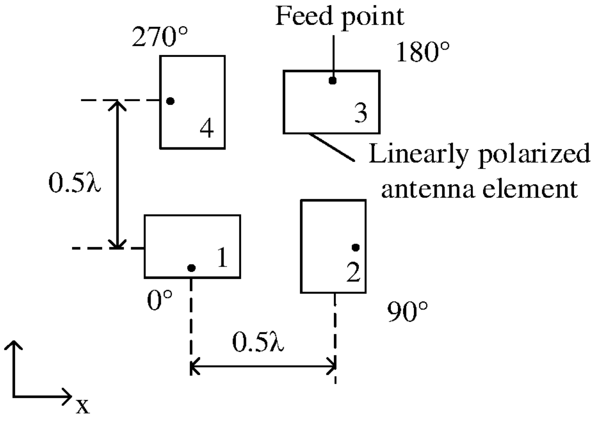
FIG. 2 is a schematic diagram of a polarization reconfigurable circularly polarized antenna according to an embodiment of this application.

As shown in FIG. 2, this application provides a polarization reconfigurable circularly polarized antenna. The circularly polarized antenna includes four linearly polarized antenna elements (numbered 1 to 4 respectively) that use rotating feed. The four linearly polarized antenna elements implement a circularly polarized wave through spatial synthesis. The four linearly polarized antenna elements are placed at an interval of 90 degrees (that is, placed orthogonally) in sequence. Optionally, a distance between any two adjacent linearly polarized antenna elements (for example, central positions of the antenna elements) is greater than or equal to 0.5 times an operating wavelength (λ). The operating wavelength herein is a wavelength of the linearly polarized antenna element during operation. The operating wavelength is related to an operating frequency.

The linearly polarized antenna element in the circularly polarized antenna may be configured with different phases by using a feed network, to implement switching between left-handed circular polarization and right-handed circular polarization. For example, phases of the four linearly polarized antenna elements may be configured to be 0°, 90°, 180°, and 270°, or −0°, −90°, −180°, and −270° respectively. It should be noted that 0°, 90°, 180°, and 270° in FIG. 2 may be considered as phases configured for each antenna element, which is merely an example of a phase configuration manner. In an actual application, positions of 0°, 90°, 180°, 270°, and the like may be defined according to an actual requirement. For example, the phase of the linearly polarized antenna element numbered 4 in FIG. 2 is defined to be 0°, the phase of the antenna element numbered 3 is defined to be 90°, the phase of the antenna element numbered 2 is defined to be 180°, and the phase of the antenna element numbered 1 is defined to be 270°.

The circularly polarized antenna synthesized by using the linearly polarized antenna elements is low in aperture efficiency (generally, a gain is 9 dB), and poor in cross polarization isolation in a diagonal direction. Based on this, this application further proposes a manner of synthesizing a circularly polarized antenna based on circularly polarized antenna elements.

An antenna subarray provided in this application is described first, which includes m antenna elements. m is an integer greater than or equal to 2. The m antenna elements are placed at an interval of 360/m degrees in sequence. Alternatively, the m antenna elements are placed at an interval of a first angle in sequence (placement may also be referred to as arrangement). A distance between any two adjacent antenna elements (for example, central positions of the antenna elements) is less than 0.5 times an operating wavelength (λ). For example, the distance between any two adjacent antenna elements may be selected to be less than or equal to 0.3 times the operating wavelength λ.

For example, a difference between the first angle and 360/m degrees is less than or equal to a first angle threshold, in other words, the first angle is infinitely close to 360/m degrees. For example, the first angle threshold may be 0.5°, 1°, or 2°. This is not limited herein in this application.

The operating wavelength herein is a wavelength of the antenna element during operation, and the wavelength is related to a frequency of a radio signal. For example, the wavelength may be 16 mm, 17 mm, 18 mm, close to 16 mm, close to 17 mm, or close to 18 mm. For example, the distance between any two adjacent antenna elements may be 5.5 mm.

In addition, a coupling degree between any two adjacent antenna elements may be less than 20 dB. Any antenna element may be a left-handed circularly polarized antenna element, or may be a right-handed circularly polarized antenna element or a linearly polarized antenna element.

Optionally, m may be equal to 4, and an overall size of the four antenna elements may be λ*λ. λ is the operating wavelength of the antenna element.

The foregoing antenna subarray provided in this application may be the circularly polarized antenna mentioned above. In a current antenna subarray, an antenna including a left-handed circularly polarized antenna element is a left-handed circularly polarized antenna, and an antenna including a right-handed circularly polarized antenna element is a right-handed circularly polarized antenna. However, in this application, the distance between any two antenna elements is controlled within 0.5λ, and phases are configured for the m antenna elements according to a phase configuration manner of phases 0°, 360°*(1/m), 360°*(2/m), . . . , and 360°*[(m−1)/m], or −0°, −360°*(1/m), −360°*(2/m), . . . , and −360°*[(m−1)/m]. Therefore, the antenna may be a right-handed circularly polarized antenna or a left-handed circularly polarized antenna.

Figure 3A:
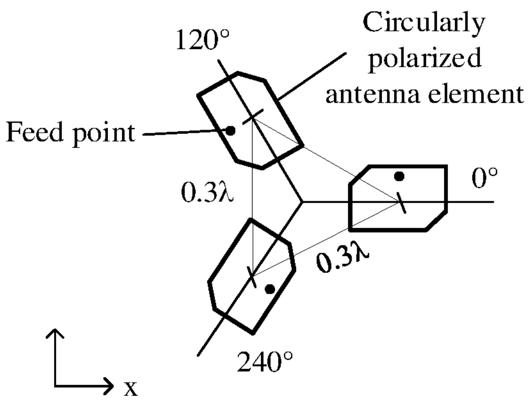
FIG. 3*a* is a schematic diagram of an antenna subarray including three circularly polarized antenna elements according to an embodiment of this application.

FIG. 3*a* is a schematic diagram of an antenna subarray including three circularly polarized antenna elements. The three circularly polarized antenna elements are placed at an interval of 120° in sequence. A distance between any two circularly polarized antenna elements is equal to 0.3λ. Phase values of the three circularly polarized antenna elements are configured according to a phase configuration manner of phases 0°, 120°, and 240°, or −0°, −120°, and −240°. Therefore, the antenna subarray may be a right-handed circularly polarized antenna or a left-handed circularly polarized antenna.

Figure 3B:
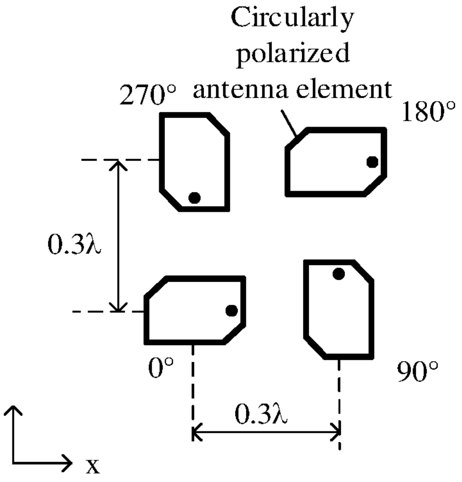
FIG. 3*b* is a schematic diagram of an antenna subarray including four circularly polarized antenna elements according to an embodiment of this application.

FIG. 3*b* is a schematic diagram of an antenna subarray including four circularly polarized antenna elements. The four circularly polarized antenna elements are placed at an interval of 90° (that is, placed orthogonally) in sequence. A distance between any two circularly polarized antenna elements is equal to 0.3λ. Phase values of the four circularly polarized antenna elements are configured according to a phase configuration manner of phases 0, 90, 180, and 270, or −0, −90, −180, and −270°. Therefore, the antenna subarray may be a right-handed circularly polarized antenna or a left-handed circularly polarized antenna.

Figure 3C:
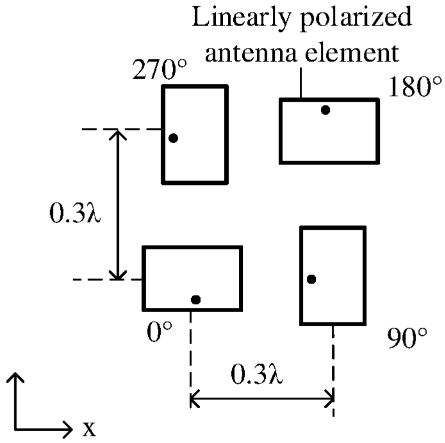
FIG. 3*c* is a schematic diagram of an antenna subarray including four linearly polarized antenna elements according to an embodiment of this application.

FIG. 3*c* is a schematic diagram of an antenna subarray including four linearly polarized antenna elements. The four linearly polarized antenna elements are placed at an interval of 90° (that is, placed orthogonally) in sequence. A distance between any two linearly polarized antenna elements is equal to 0.3λ. Phase values of the four linearly polarized antenna elements are configured according to a phase configuration manner of phases 0, 90, 180, and 270, or −0, −90, −180, and −270°. Therefore, the antenna subarray may be a right-handed circularly polarized antenna or a left-handed circularly polarized antenna.

The following describes an antenna array provided in this application. The antenna array includes one or more antenna subarrays described above. Generally, a plurality of antenna subarrays are arranged regularly or evenly. For example, a difference of distances between any two adjacent antenna subarrays of the plurality of antenna subarrays may be less than or equal to a first preset value. The first preset value may be, for example, 0.1 mm, 0.15 mm, or 0.2 mm. For example, a distance between any two adjacent antenna elements in the antenna subarray is less than 0.5λ. For example, the distance between any two adjacent antenna elements in the antenna subarray may be less than or equal to 0.3λ.

Figure 4:
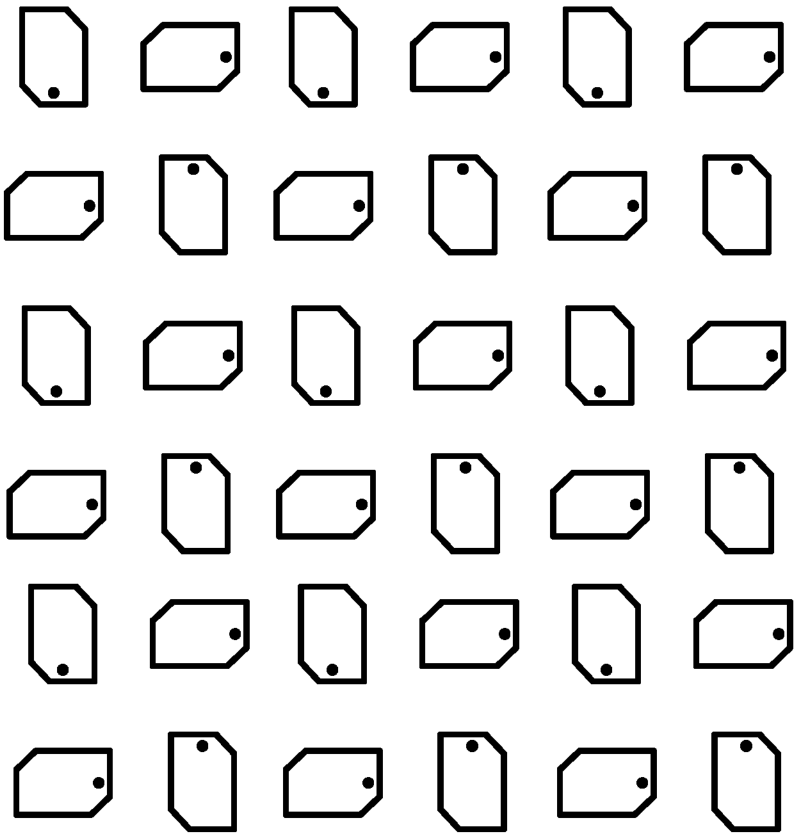
FIG. 4 is a schematic diagram of an antenna array including nine antenna subarrays according to an embodiment of this application.

As shown in FIG. 4, an antenna array including nine antenna subarrays is provided. Each antenna subarray includes four circularly polarized antenna elements. The nine antenna subarrays are arranged at equal intervals in three rows and three columns.

Compared with a conventional array antenna, the polarization reconfigurable antenna in this application has a small antenna diameter and a small spacing, and may avoid generation of a grating lobe during large-angle scanning.

Based on the antenna array described above, this application further provides a communication device. The communication device includes the antenna array described above. The communication device may be any device on which the antenna array may be disposed, for example, may be a network device such as a base station, or may be a terminal device. This is not limited in this application.

Figure 5:
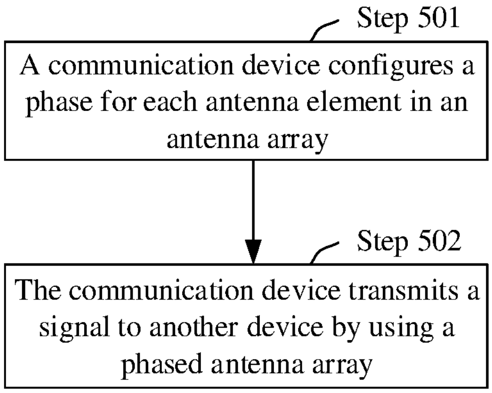
FIG. 5 shows a polarization reconfiguration method for an antenna array according to an embodiment of this application.

Based on the content described above, this application further provides a method for performing polarization reconfiguration on the foregoing antenna array. As shown in FIG. 5, the method includes the following steps.

Step 501: The communication device configures a phase for each antenna element in the antenna array.

Step 502: The communication device transmits a signal to another device by using a phased antenna array.

The communication device may be a network device, or may be a terminal device. The communication device may be a signal transmit end, or may be a signal receive end.

The phase is used to control a polarization manner of the antenna subarray to be left-handed circular polarization or right-handed circular polarization. Polarization manners of the plurality of antenna subarrays are the same, for example, are all left-handed circular polarization or right-handed circular polarization. For example, a phase difference between any two adjacent antenna elements in the antenna subarray is 360/m degrees or a second angle. For example, a difference between the second angle and 360/m degrees is less than or equal to a second angle threshold, that is, the second angle is infinitely close to 360/m degrees. For example, the second angle threshold is 0.50°, 1°, or 2°.

In an example, the communication device stores a phase configuration manner corresponding to left-handed circular polarization, and also stores a phase configuration manner corresponding to right-handed circular polarization. The phase configuration manner includes the phase of each antenna element. When determining that a left-handed circularly polarized antenna is required to transmit a radio signal, the communication device configures the phase for each antenna element in the antenna array by using the pre-stored phase configuration manner corresponding to left-handed circular polarization. When determining that a right-handed circularly polarized antenna is required to transmit a radio signal, the communication device configures the phase for each antenna element in the antenna array by using the pre-stored phase configuration manner corresponding to right-handed circular polarization. A process in which the communication device determines whether the left-handed circularly polarized antenna or the right-handed circularly polarized antenna is required to transmit the radio signal is not limited in this application.

In another example, the communication device determines a transmission matrix between the communication device and the another device based on transmit power of the communication device and transmit power of the another device. The transmission matrix includes a plurality of transmission coefficients. Each transmission coefficient is associated with a port corresponding to each antenna element in the communication device. Then, the communication device determines a plurality of non-zero eigenvalues of the transmission matrix, and determines a maximum value in the non-zero eigenvalues. Next, the communication device determines an eigenvector corresponding to the maximum value. The eigenvector includes a phase value of the port corresponding to each antenna element in the communication device. Next, the communication device configures the phase for the antenna element in the antenna array based on the eigenvector.

Optionally, the eigenvector further includes an amplitude value of the port corresponding to each antenna element in the communication device.

The eigenvector corresponding to the maximum eigenvalue is calculated by using the transmission matrix between the communication device and the another device. The phase is configured for the antenna array based on the eigenvector. In this way, a most appropriate polarization manner for communication between the communication device and the another device may be reconfigured, and communication may be performed in the most appropriate polarization manner, thereby improving transmission efficiency.

Figure 6:
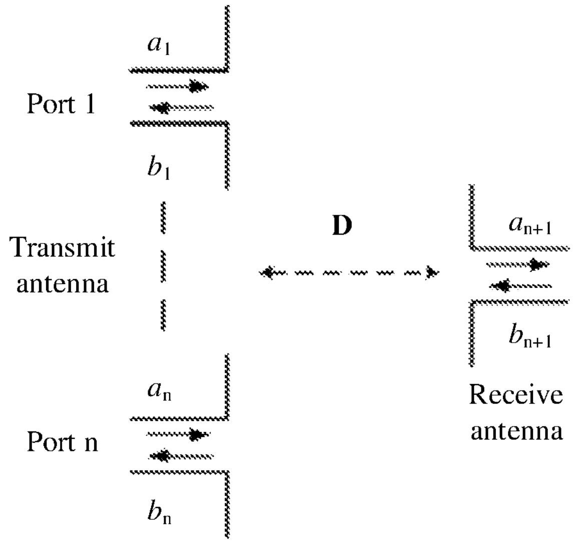
FIG. 6 is a schematic diagram of a transmit antenna and a receive antenna according to an embodiment of this application.

As shown in FIG. 6, the following describes a process of determining the transmission matrix by using an example in which the antenna array in the communication device is a transmit antenna and an antenna in the another device is a receive antenna.

The transmit antenna of the communication device includes n antenna elements. The n antenna elements correspond to n ports, which are a port 1, . . . , and a port n. a1 . . . , and an represent incident waves of the n ports in the transmit antenna. That is, the signal is input to the port 1 to the port n, and is sent to the receive antenna through the port 1 to the port n. b1 . . . , and bn represent reflected signals at the antenna ports. Theoretically, the smaller the reflected signal, the better the signal quality.

An identifier of an incident wave at a port of the receive antenna of the another device is an+1, and an identifier of a reflected wave is bn+1.

The transmission matrix between the communication device and the another device is $S_{rt}$.

$$T_{array}\frac{\frac{1}{2}\left(\|[b_r]\|^2-\|[a_r]\|^2\right)}{\frac{1}{2}\left(\|[b_t]\|^2-\|[a_t]\|^2\right)},$$

and $T_{array}=\overline{[S_{rt}]}^T\,[S_{rt}]$, where a letter subscript t represents the transmit antenna, and a subscript r represents the receive antenna. $[a_1]=[a_1, a_2, \ldots, a_n]$T, represents a power value (for example, a normalized power value) of the incident wave of the transmit antenna array in the communication device. $[a_r]=[a_{n+1}]$. represents a power value (for example, a normalized power value) of the incident wave of the receive antenna in the another device. $[b_1]=[b_1, b_2, \ldots, b_n]^T$, represents a power value (for example, a normalized power value) of a reflected wave of the transmit antenna array in the communication device. $[b_r]=[b_{n+1}]$ represents a power value (for example, a normalized power value) of the reflected wave of the receive antenna in the another device.

$\overline{[S_{rt}]}^T\,[S_{rt}]$ may be obtained based on $[a_1]=[a_1, a_2, \ldots, a_n]$, $[a_r]=[a_{n+1}]$, $[b_1]=[b_1, b_2, \ldots, b_n]^T$, and $[b_r]=[_{n+1}]$, and then the transmission matrix $S_{rt}$ is further calculated.

In FIG. 6, an example in which the antenna array in the communication device is a transmit antenna is used for description. The foregoing example of calculating the transmission matrix is also applicable to a case in which the antenna array in the communication device is used as a receive antenna and the antenna in the another device is used as a transmit antenna.

In this application, a circularly polarized antenna is synthesized by using a plurality of tightly coupled rotating circularly polarized antenna elements, and is switched between left-handed circular polarization and right-handed circular polarization by changing configured phases. For example, a specific phase configuration manner may be that the circularly polarized array antenna is used as a transmit antenna, and an orthogonally polarized antenna element of the circularly polarized array antenna is used as a receive antenna. A transmission matrix S between the transmit array antenna and the receive antenna is calculated to obtain an eigenvector corresponding to a maximum eigenvalue in the transmission matrix, that is, an amplitude and a phase value of the array antenna.

With reference to FIG. 7*a*, FIG. 7*b*, FIG. 8*a*, FIG. 8*b*, FIG. 9*a*, and FIG. 9*b*, the following describes simulation results of implementing a left-handed circular polarization function and a right-handed circular polarization function for an antenna array through phase configuration.

Figure 7A:
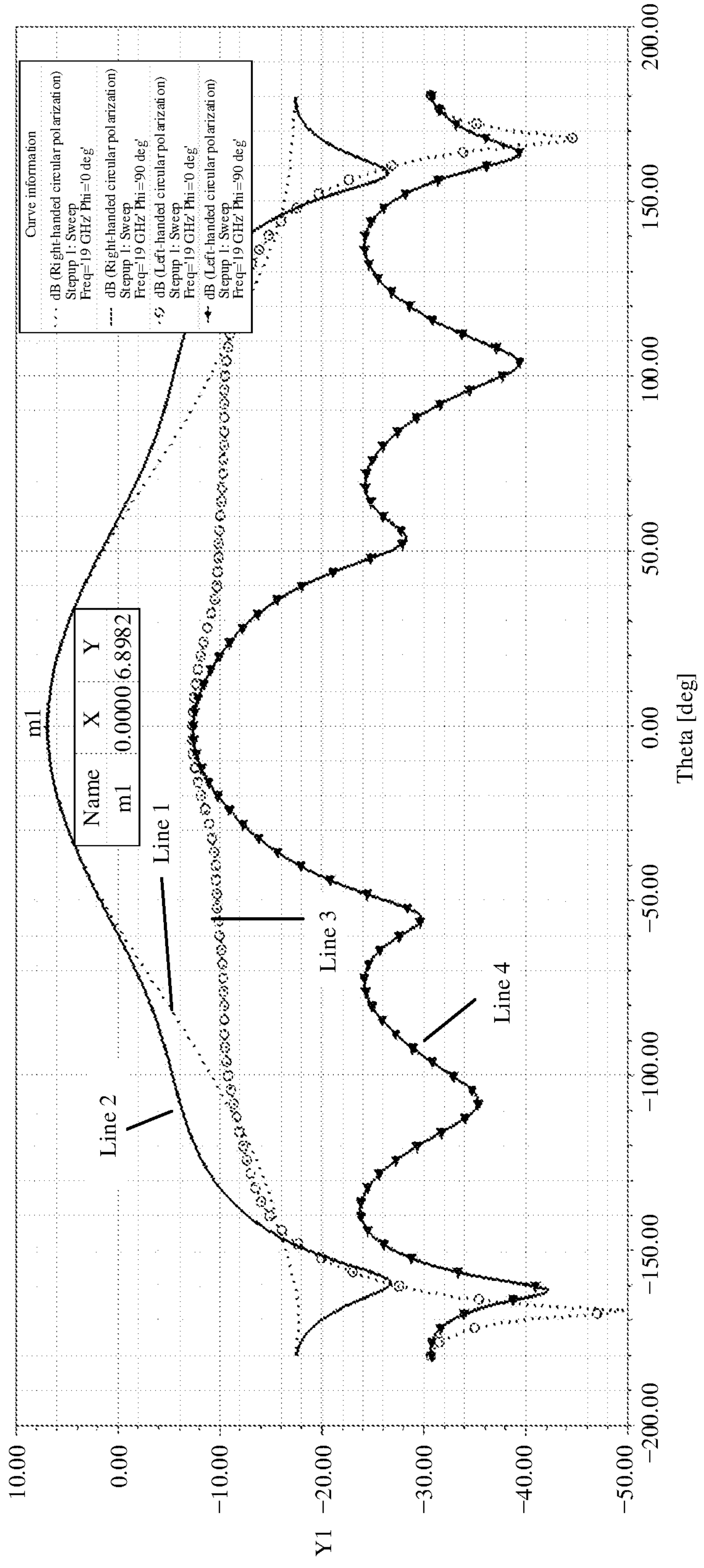
FIG. 7*a*, FIG. 8*a*, and FIG. 9*a* each are schematic diagrams of simulation of right-handed circular polarization according to an embodiment of this application.
Figure 7B:
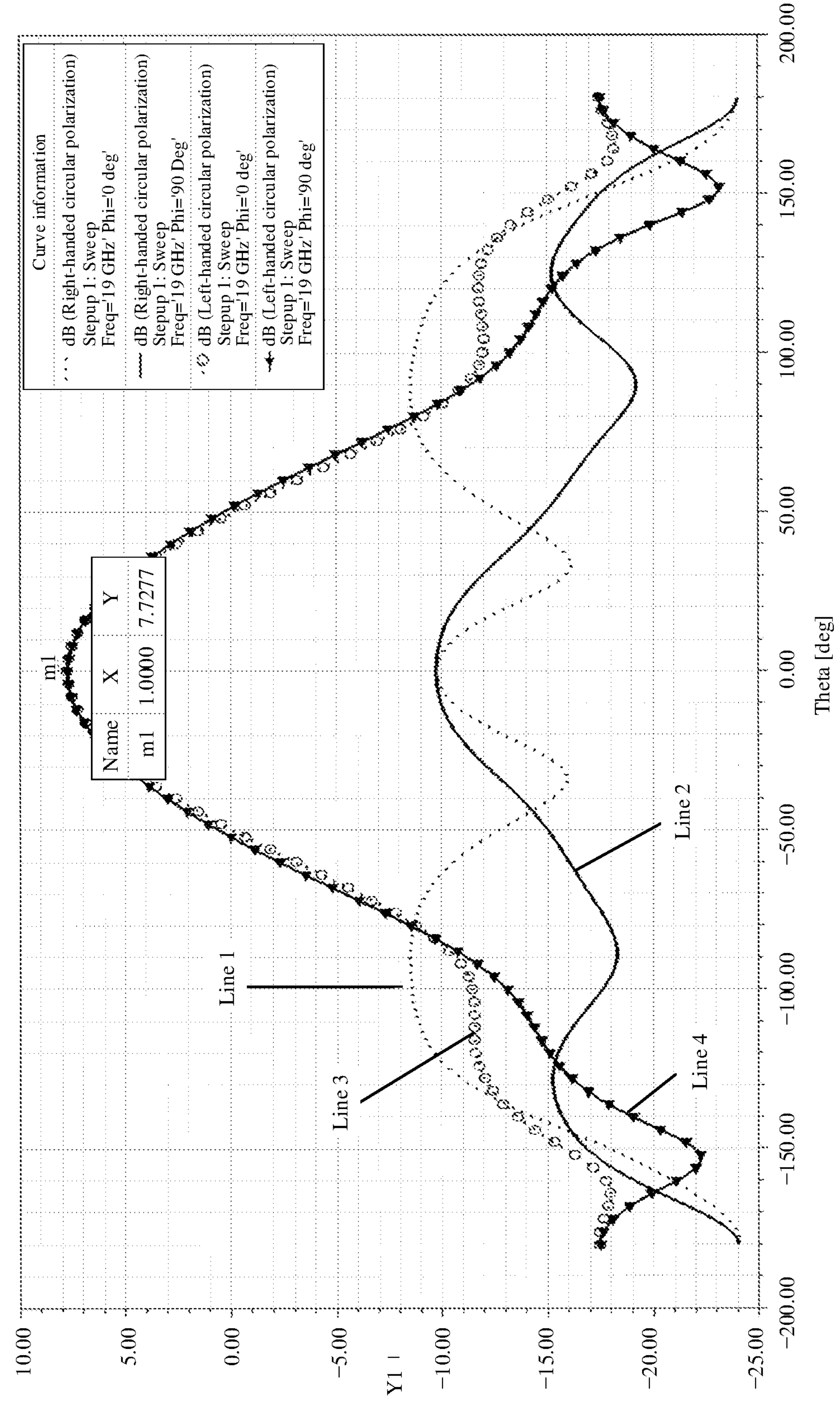
FIG. 7*b*, FIG. 8*b*, and FIG. 9*b* each are schematic diagrams of simulation of left-handed circular polarization according to an embodiment of this application.

FIG. 7*a* is a schematic diagram of a simulation result of implementing right-handed circular polarization by using the antenna array including the four circularly polarized antenna elements shown in FIG. 3*b*. FIG. 7*b* is a schematic diagram of a simulation result of implementing left-handed circular polarization by using the antenna array including the four circularly polarized antenna elements shown in FIG. 3*b*. A vertical coordinate represents an amplitude (unit: dB), and a horizontal coordinate represents an angle (unit: deg). In FIG. 7*a* and FIG. 7*b*, four lines are described in curve information (curve info): a line 1, a line 2, a line 3, and a line 4. The line 1 produces right-handed circular polarization (realized gain RHCP), an operating frequency (freq) of the antenna element is 19 GHz, and Phi=0 deg. The line 2 produces right-handed circular polarization (realized gain RHCP), the operating frequency (freq) of the antenna element is 19 GHz, and Phi=90 deg. The line 3 produces left-handed circular polarization (realized gain LHCP), the operating frequency (freq) of the antenna element is 19 GHz, and Phi=0 deg. The line 4 produces left-handed circular polarization (realized gain RHCP), the operating frequency (freq) of the antenna element is 19 GHz, and Phi=90 deg.

In FIG. 7*a*, amplitude values of the line 1 and the line 2 are greater than those of the line 3 and the line 4, so that right-handed circular polarization corresponding to the line 1 and the line 2 is implemented. In FIG. 7*b*, amplitude values of the line 3 and the line 4 are greater than those of the line 1 and the line 2, so that left-handed circular polarization corresponding to the line 3 and the line 4 is implemented.

Figure 8A:
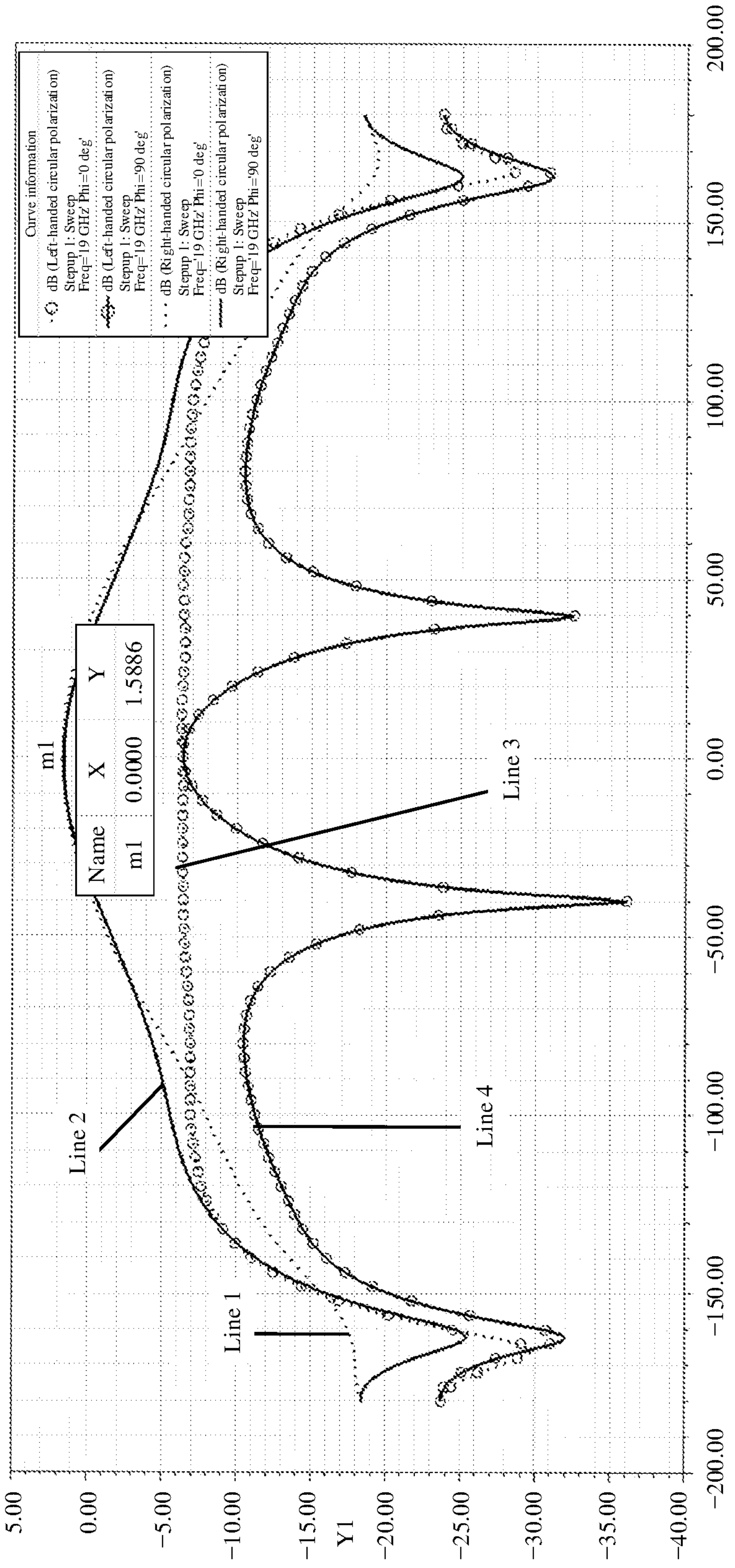
Figure 8B:
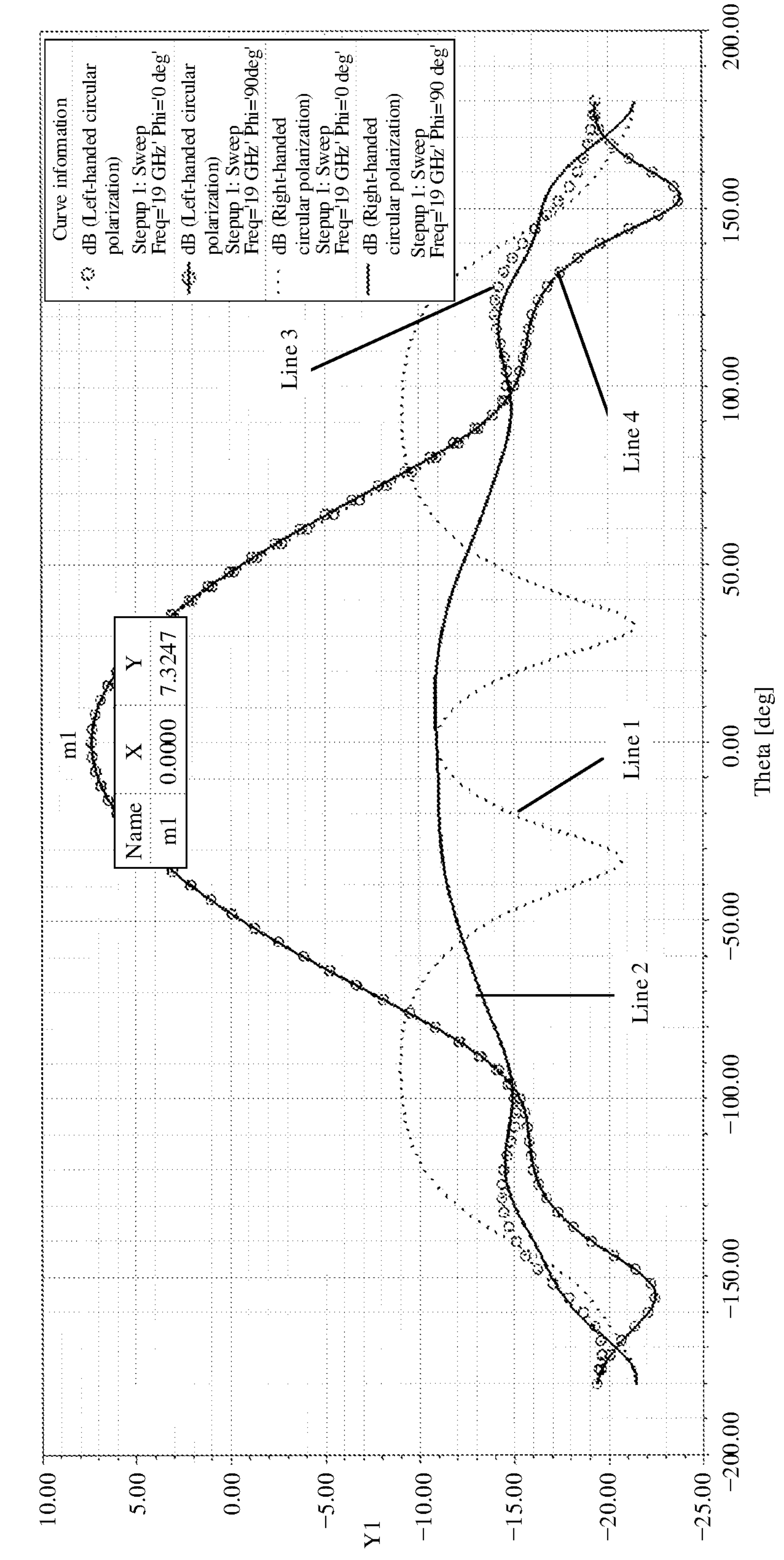

FIG. 8*a* is a schematic diagram of a simulation result of implementing right-handed circular polarization by using the antenna array including the four linearly polarized antenna elements shown in FIG. 3*c*. FIG. 8*b* is a schematic diagram of a simulation result of implementing left-handed circular polarization by using the antenna array including the four linearly polarized antenna elements shown in FIG. 3*c*. A horizontal coordinate, a vertical coordinate, and curve information are similar to those in FIG. 7*a* and FIG. 7*b*, and details are not described again. In FIG. 8*a*, amplitude values of a line 1 and a line 2 are greater than those of a line 3 and a line 4, so that right-handed circular polarization corresponding to the line 1 and the line 2 is implemented. In FIG. 8*b*, amplitude values of the line 3 and the line 4 are greater than those of the line 1 and the line 2, so that left-handed circular polarization corresponding to the line 3 and the line 4 is implemented.

A reconfigurable antenna including linearly polarized units may also be reconfigured into a left/right-handed circularly polarized antenna, but has lower aperture efficiency than a reconfigurable antenna including circularly polarized antenna elements.

Figure 9A:
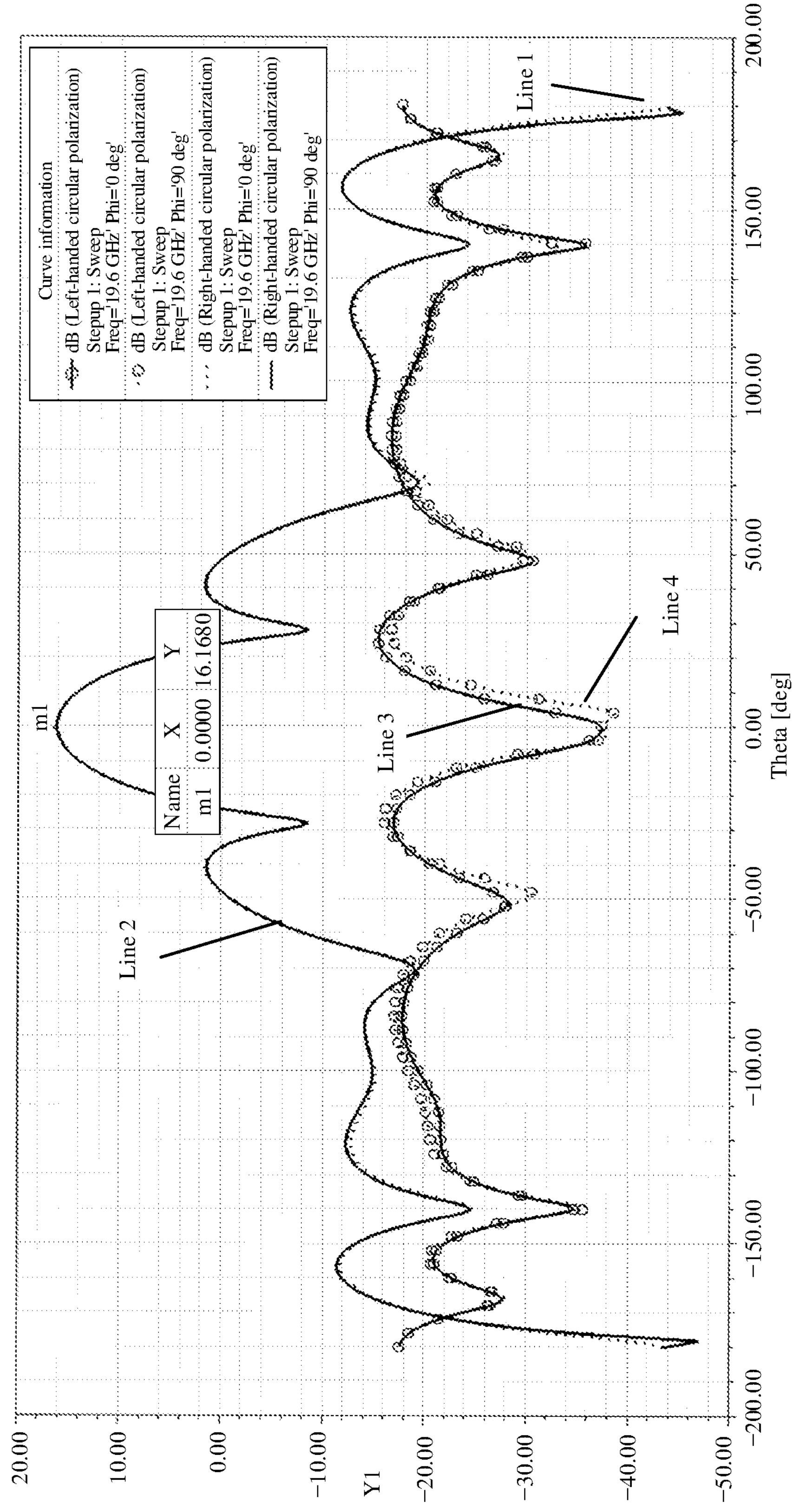
Figure 9B:
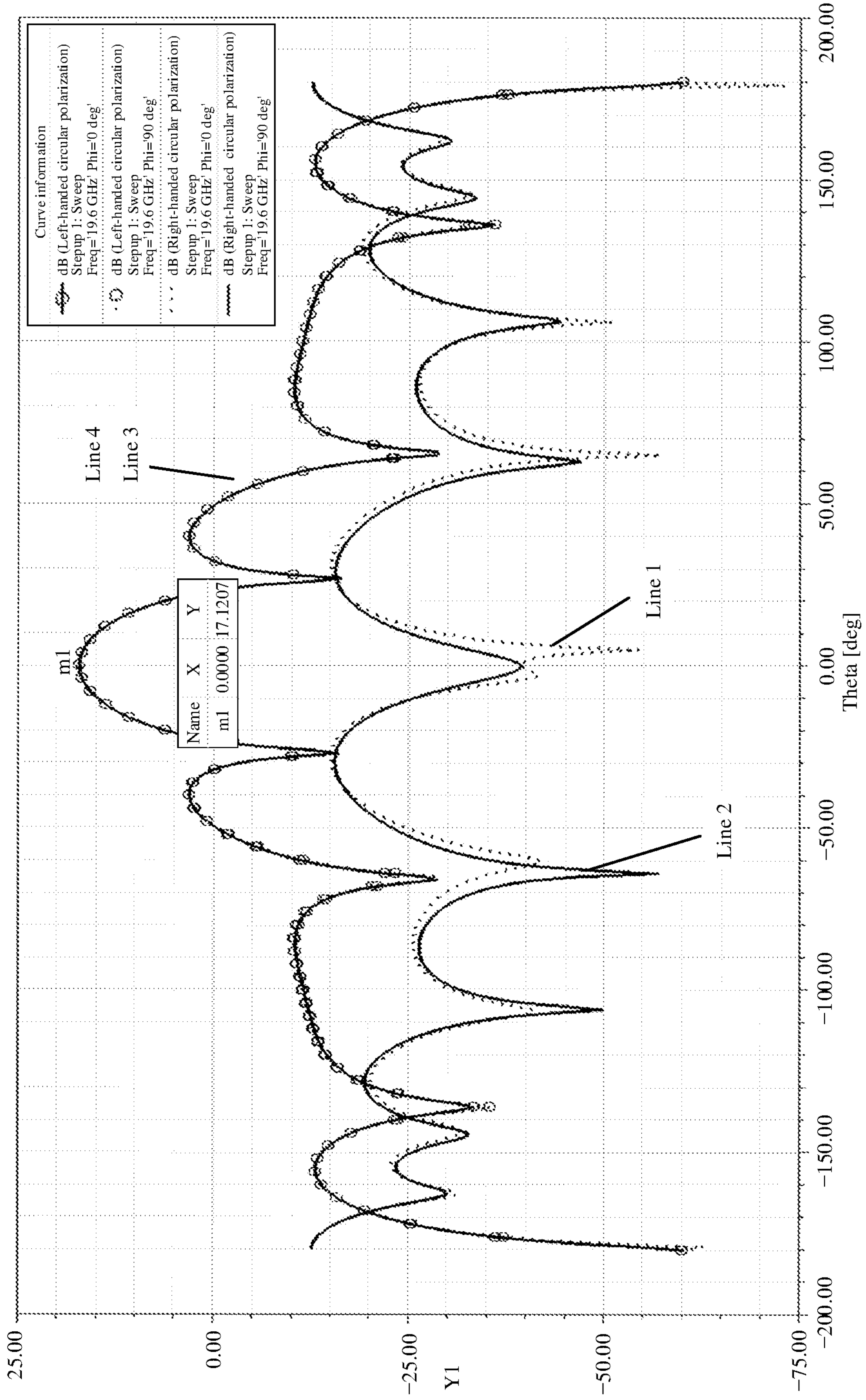

FIG. 9*a* is a schematic diagram of simulation of implementing right-handed circular polarization by using the antenna array shown in FIG. 4. FIG. 9*b* is a schematic diagram of simulation of implementing left-handed circular polarization by using the antenna array shown in FIG. 4. A horizontal coordinate, a vertical coordinate, and curve information are similar to those in FIG. 7*a* and FIG. 7*b*, and a difference lies in that an operating frequency (freq) is 19.6 GHz. Other content is not described again. In FIG. 9*a*, amplitude values of a line 1 and a line 2 are greater than those of a line 3 and a line 4, so that right-handed circular polarization corresponding to the line 1 and the line 2 is implemented. In FIG. 9*b*, amplitude values of the line 3 and the line 4 are greater than those of the line 1 and the line 2, so that left-handed circular polarization corresponding to the line 3 and the line 4 is implemented.

It can be learned from FIG. 7*a*, FIG. 7*b*, FIG. 8*a*, FIG. 8*b*, FIG. 9*a*, and FIG. 9*b* that the antenna array implements the left-handed circular polarization function and the right-handed circular polarization function through phase configuration.

It may be understood that, to implement functions in the foregoing embodiments, the communication device includes a corresponding hardware structure and/or software module for performing each function. A person skilled in the art should be easily aware that the units and the steps of the method in the examples described with reference to embodiments disclosed in this application may be implemented in a form of hardware or a combination of hardware and computer software in this application. Whether a function is performed by hardware or hardware driven by computer software depends on a particular application scenario and a design constraint of the technical solutions.

Figure 10:
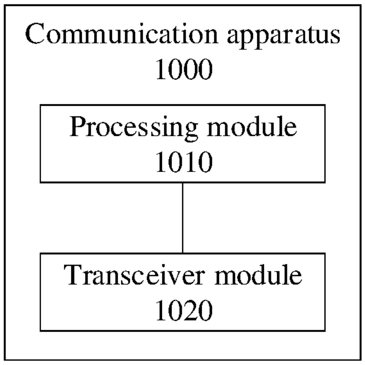
FIG. 10 is a schematic diagram of a communication apparatus according to an embodiment of this application.
Figure 11:
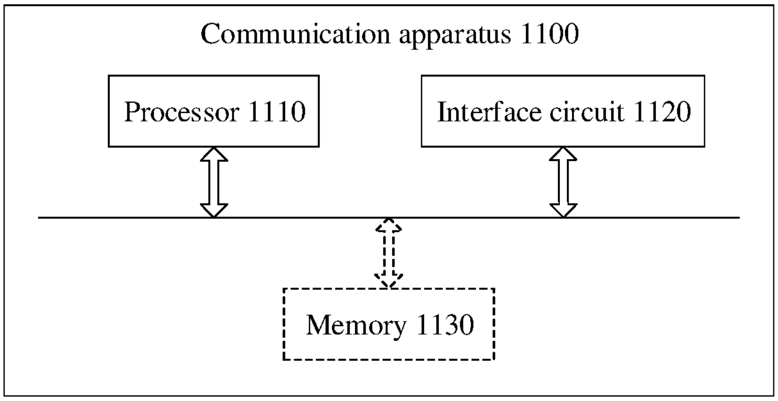
FIG. 11 is a schematic diagram of a communication apparatus according to an embodiment of this application.

FIG. 10 and FIG. 11 are schematic diagrams of structures of possible communication apparatuses according to embodiments of this application. The communication apparatuses may be configured to implement a function of the communication device in the foregoing method embodiment. Therefore, beneficial effects of the foregoing method embodiment can also be implemented.

As shown in FIG. 10, a communication apparatus 1000 includes a processing module 1010 and a transceiver module 1020. The communication apparatus 1000 is configured to implement the function of the communication device in the foregoing method embodiment. For example, the communication apparatus 1000 is configured to implement a function of the communication device in the method embodiment shown in FIG. 5. Specifically, the processing module 1010 is configured to: determine a transmission matrix between the apparatus and another device based on transmit power between the apparatus and the another device; determine a maximum value in a plurality of non-zero eigenvalues of the transmission matrix, and determine an eigenvector corresponding to the maximum value; and configure a phase for an antenna element in an antenna array based on the eigenvector. Then, the transceiver module 1020 is configured to transmit a signal to the another device by using a phased antenna array.

For more detailed descriptions of the processing module 1010 and the transceiver module 1020, directly refer to related descriptions in the foregoing method embodiment. Elaborations are omitted herein.

As shown in FIG. 11, a communication apparatus 1100 includes a processor 1110 and an interface circuit 1120. The processor 1110 and the interface circuit 1120 are coupled to each other. It may be understood that the interface circuit 1120 may be a transceiver or an input/output interface. Optionally, the communication apparatus 1100 may further include a memory 1130 configured to store instructions executed by the processor 1110, input data required by the processor 1110 to run instructions, or data generated after the processor 1110 runs instructions.

When the communication apparatus 1100 is configured to implement the foregoing method, the processor 1110 is configured to implement a function of the processing module 1010, and the interface circuit 1120 is configured to implement a function of the transceiver module 1020.

When the communication apparatus is a chip applied to a terminal device, the chip in the terminal device implements a function of a terminal device in the foregoing method embodiment. The chip in the terminal device receives information from another module (for example, a radio frequency module or an antenna) in the terminal device, and the information is sent by a network device to the terminal device. Alternatively, the chip in the terminal device sends information to another module (for example, a radio frequency module or an antenna) in the terminal device, and the information is sent by the terminal device to a network device.

When the communication apparatus is a chip applied to a network device, the chip in the network device implements a function of a network device in the foregoing method embodiment. The chip in the network device receives information from another module (for example, a radio frequency module or an antenna) in the network device, and the information is sent by a terminal device to the network device. Alternatively, the chip in the network device sends information to another module (for example, a radio frequency module or an antenna) in the network device, and the information is sent by the network device to a terminal device.

It may be understood that the processor in embodiments of this application may be a central processing unit (CPU), or may be another general-purpose processor, a digital signal processor (DSP), an application-specific integrated circuit (ASIC), a field programmable gate array (FPGA) or another programmable logic device, a transistor logic device, a hardware component, or any combination thereof. The general-purpose processor may be a microprocessor, any conventional processor, or the like.

The steps of the method in embodiments of this application may be implemented in a hardware manner, or may be implemented in a manner of executing software instructions by the processor. The software instruction may include a corresponding software module. The software module may be stored in a random access memory, a flash, a read-only memory, a programmable read-only memory, an erasable programmable read-only memory, an electrically erasable programmable read-only memory, a register, a hard disk, a removable hard disk, a CD-ROM, or a storage medium in any other form well-known in the art. For example, a storage medium is coupled to a processor, so that the processor is enabled to read information from the storage medium and write information into the storage medium. Certainly, the storage medium may be a component of the processor. The processor and the storage medium may be disposed in an ASIC. In addition, the ASIC may be located in a network device or a terminal device. Certainly, the processor and the storage medium may exist in a network device or a terminal device as discrete components.

All or some of the foregoing embodiments may be implemented by software, hardware, firmware, or any combination thereof. When the software is used to implement the embodiments, all or some of the embodiments may be implemented in a form of a computer program product. The computer program product includes one or more computer programs and instructions. When the computer programs or instructions are loaded and executed on a computer, all or some of the procedures or functions in embodiments of this application are executed. The computer may be a general-purpose computer, a dedicated computer, a computer network, a network device, user equipment, or another programmable apparatus. The computer programs or instructions may be stored in a computer-readable storage medium, or may be transmitted from a computer-readable storage medium to another computer-readable storage medium. For example, the computer programs or instructions may be transmitted from a website, computer, server, or data center to another website, computer, server, or data center in a wired manner or in a wireless manner. The computer-readable storage medium may be any usable medium accessible by a computer, or a data storage device, for example, a server or a data center, integrating one or more usable media. The usable medium may be a magnetic medium, for example, a floppy disk, a hard disk, or a magnetic tape, may be an optical medium, for example, a digital video disc, or may be a semiconductor medium, for example, a solid state disk.

In embodiments of this application, if there are no special statements and logic conflicts, terms and/or descriptions between different embodiments are consistent and may be mutually referenced, and technical features in different embodiments may be combined based on an internal logical relationship thereof, to form a new embodiment.

In this application, "at least one" means one or more, and "a plurality of" means two or more. "And/or" describes an association relationship between associated objects, and represents that three relationships may exist. For example, A and/or B may represent the following cases: Only A exists, both A and B exist, and only B exists. A and B each may be singular or plural. In the text descriptions of this application, the character "/" generally indicates an "or" relationship between the associated objects. In a formula in this application, the character "/" indicates a "division" relationship between the associated objects.

It may be understood that various numbers in embodiments of this application are merely used for distinguishing for ease of description, and are not intended to limit the scope of embodiments of this application. The sequence numbers of the foregoing processes do not mean an execution sequence. The execution sequence of the processes should be determined based on functions and internal logic of the processes.

What is claimed is:

1. A polarization reconfiguration apparatus, comprising:

an antenna array comprising a plurality of antenna elements;

at least one processor; and memory storing instructions that, when executed by the at least one processor, cause the polarization reconfiguration apparatus to:

determine a transmission matrix between the polarization reconfiguration apparatus and another device based on transmit power between the polarization reconfiguration apparatus and the another device, wherein the transmission matrix comprises a plurality of transmission coefficients, and each transmission coefficient is associated with a port corresponding to a respective antenna element of the plurality of antenna elements;

determine a maximum value in a plurality of non-zero eigenvalues of the transmission matrix;

determine an eigenvector corresponding to the maximum value, wherein the eigenvector includes a phase value associated with the port corresponding to each respective antenna element of the plurality of antenna elements; and configure a phase for each of the plurality of antenna elements in the antenna array based on the phase value associated with the port corresponding to each respective antenna element as indicated by the determined eigenvector; and a transceiver, configured to:

transmit a signal to the another device by using the antenna array.

2. The polarization reconfiguration apparatus according to claim 1, wherein the antenna array comprises a plurality of antenna subarrays, wherein each antenna subarray of the plurality of antenna subarrays comprises m antenna elements, wherein m is an integer greater than or equal to 2, wherein, for each antenna subarray, the m antenna elements of the antenna subarray are placed at an interval of 360/m degrees in sequence, and a distance between any two adjacent antenna elements is less than 0.5 times an operating wavelength.

3. The polarization reconfiguration apparatus according to claim 2, wherein the distance between any two adjacent antenna elements is less than or equal to 0.3 times the operating wavelength.

4. The polarization reconfiguration apparatus according to claim 2, wherein at least one antenna element of the m antenna elements of at least one of the antenna subarrays is a left-handed circularly polarized antenna element.

5. The polarization reconfiguration apparatus according to claim 2, wherein at least one antenna element of the m antenna elements of at least one of the antenna subarrays is a right-handed circularly polarized antenna element.

6. The polarization reconfiguration apparatus according to claim 2, wherein a difference of distances between any two adjacent antenna subarrays of a plurality of antenna subarrays is less than or equal to a first preset value.

7. The polarization reconfiguration apparatus according to claim 2, wherein the polarization reconfiguration apparatus is disposed in a communication device.

8. The polarization reconfiguration apparatus according to claim 7, wherein a difference of distances between any two adjacent antenna subarrays of the plurality of antenna subarrays is less than or equal to a first preset value.

9. A communication device comprising:

an antenna array comprising a plurality of antenna elements;

at least one processor; and a memory storing instructions that, when executed by the at least one processor, cause the communication device to:

determine a transmission matrix between the communication device and another device based on transmit power of the communication device and transmit power of the another device, wherein the transmission matrix comprises a plurality of transmission coefficients, and each transmission coefficient is associated with a port corresponding to a respective antenna element of the plurality of antenna elements;

determine a maximum value in a plurality of non-zero eigenvalues of the transmission matrix;

determine an eigenvector corresponding to the maximum value, wherein the eigenvector includes a phase value associated with the port corresponding to each respective antenna element of the plurality of antenna elements; and configure a phase for each of the plurality of antenna elements in the antenna array based on the phase value associated with the port corresponding to each respective antenna element as indicated by the determined eigenvector, wherein the antenna array comprises a plurality of antenna subarrays, wherein each antenna subarray of the plurality of antenna subarrays comprises m antenna elements, wherein m is an integer greater than or equal to 2, wherein, for each antenna subarray, the m antenna elements of the antenna subarray are placed at an interval of 360/m degrees in sequence, and a distance between any two adjacent antenna elements of the m antenna elements is less than 0.5 times an operating wavelength.

10. The communication device according to claim 9, wherein the distance between any two adjacent antenna elements is less than or equal to 0.3 times the operating wavelength.

11. The communication device according to claim 9, wherein at least one antenna element of the m antenna elements of at least one of the antenna subarrays is a left-handed circularly polarized antenna element.

12. The communication device according to claim 9, wherein at least one antenna element of the m antenna elements of at least one of the antenna subarrays is a right-handed circularly polarized antenna element.

13. A communication device comprising:

an antenna array comprising a plurality of antenna elements;

at least one processor; and a memory storing instructions that, when executed by the at least one processor, cause the communication device to:

determine a transmission matrix between the communication device and another device based on transmit power of the communication device and transmit power of the another device, wherein the transmission matrix comprises a plurality of transmission coefficients, and each transmission coefficient is associated with a port corresponding to a respective antenna element of the plurality of antenna elements;

determine a maximum value in a plurality of non-zero eigenvalues of the transmission matrix;

determine an eigenvector corresponding to the maximum value, wherein the eigenvector includes a phase value associated with the port corresponding to each respective antenna element of the plurality of antenna elements; and configure a phase for each of the plurality of antenna elements in the antenna array based on the phase value associated with the port corresponding to each respective antenna element as indicated by the determined eigenvector, wherein the antenna array comprises a plurality of antenna subarrays, wherein each antenna subarray of the plurality of antenna subarrays comprises m antenna elements, wherein m is an integer greater than or equal to 2, and wherein a difference of distances between any two adjacent antenna subarrays of a plurality of antenna subarrays is less than or equal to a first preset value.

14. The communication device according to claim 13, wherein the first preset value is less than or equal to 0.3 times an operating wavelength.

15. The communication device according to claim 13, wherein the first preset value is less than or equal to 0.5 times an operating wavelength.

16. The communication device according to claim 13, wherein at least one antenna element of the m antenna elements of at least one of the antenna subarrays is a left-handed circularly polarized antenna element.

17. The communication device according to claim 13, wherein at least one antenna element of the m antenna elements of at least one of the antenna subarrays is a right-handed circularly polarized antenna element.

18. The communication device according to claim 13, wherein, for each antenna subarray, the m antenna elements of the antenna subarray are placed at an interval of 360/m degrees in sequence.

19. The communication device according to claim 13, wherein the communication device is a terminal device.

20. The communication device according to claim 13, wherein the communication device is a base station.

* * * * *